(12) United States Patent
Shimizu et al.

(10) Patent No.: US 7,123,820 B2
(45) Date of Patent: Oct. 17, 2006

(54) DIGITAL RECORDING/REPRODUCING APPARATUS FOR SURVEILLANCE

(75) Inventors: Toshihiro Shimizu, Kanagawa (JP); Haruo Tagawa, Tokyo (JP); Masahiko Misawa, Kanagawa (JP); Hirofumi Iseto, Kanagawa (JP); Wataru Nakaya, Kanagawa (JP); Hiroshi Kimata, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1176 days.

(21) Appl. No.: 09/841,262

(22) Filed: Apr. 24, 2001

(65) Prior Publication Data

US 2002/0051059 A1 May 2, 2002

(30) Foreign Application Priority Data

Apr. 26, 2000 (JP) .................. P. 2000-126079

(51) Int. Cl.
*H04N 5/91* (2006.01)
*H04N 7/00* (2006.01)

(52) U.S. Cl. .............................. 386/107; 386/46
(58) Field of Classification Search ............. 386/95, 386/46, 92, 1; 348/211.13, 211.11, 143
See application file for complete search history.

(56) References Cited

U.S. PATENT DOCUMENTS 6,049,353 A  4/2000 Gray 6,647,200 B1 * 11/2003 Tanaka .................. 386/46
6,700,605 B1 *  3/2004 Toyoda et al. ......... 348/211.13

FOREIGN PATENT DOCUMENTS

| | | |
|---|---|---|
| EP | 0 371 150 A1 | 11/1988 |
| EP | 0 895 421 A2 | 7/1998 |
| EP | 0 895 421 A3 | 7/1998 |
| EP | 0 957 633 A1 | 5/1999 |
| GB | 2 326 049 A | 12/1998 |
| JP | 8-237588 | 9/1996 |
| JP | 10-285504 | 10/1998 |

* cited by examiner

Primary Examiner—Robert Chevalier
(74) Attorney, Agent, or Firm—Pearne & Gordon LLP

(57) ABSTRACT

Arbitrarily setting display patterns of live pictures or reproduced pictures per monitoring area in accordance with the purpose of use. Video signals 41 of the picture shot by monitoring cameras installed in a plurality of locations are digitized per monitoring area using the predetermined standard and recorded on video recording apparatus 8. The video signals 41 are displayed on a monitor (not shown) as live pictures. In this practice, the signals undergo the multi-screen processing via multi-screen reproduce/decoding control means 11 and displayed on screens split by monitoring camera in a monitoring area or by monitoring area.

6 Claims, 14 Drawing Sheets

FIG. 2

| AREA IDENTIFIER | 1, 2, ···, M |
|---|---|
| RELEVANT CAMERA INFORMATION | NUMBER OF RELEVANT CAMERAS, CAMERA NO. |
| HIDDEN CAMERA INFORMATION | CAMERA NO. |
| VIDEO RECORDING STATE | HALT, TIMER VIDEO RECORDING (NORMAL), TIMER VIDEO RECORDING (ALARM) |
| VIDEO RECORDING DATA INFORMATION | VIDEO RECORDING DATA, DATA SERIAL NO., NUMBER OF RECORDED EXPOSURES, RECORDING RATE, PICTURE QUALITY, HIDDEN CAMERA INFORMATION |
| REPRODUCING OPERATION STATE | UNDER REPRODUCING/SUSPEND/REPRODUCING HALT (LIVE SCREEN DISPLAY) |
| REPRODUCED DATA INFORMATION | VIDEO RECORDING DATA, DATA SERIAL NO., TOTAL NUMBER OF RECORDED EXPOSURES, NUMBER OF REPRODUCED EXPOSURES/TIME, PRESENCE/ABSENCE OF ALARM, HIDDEN CAMERA REPRODUCE STATE |
| CUMULATIVE ALARM OPERATION INFORMATION | |
| SCREEN DISPLAY POSITION INFORMATION | |

FIG. 4

TIMER VIDEO RECORDING INFORMATION

| AREA IDENTIFIER | 1, 2, ..., M | | |
|---|---|---|---|
| SUNDAY | TABLE 1 | TIME XX: XX ~ XX: XX | NORMAL OPERATION: PICTURE QUALITY, RECORDING RATE, PRESENCE/ABSENCE OF AUTOMATIC BACKUP |
| | | | ALARM OPERATION: PICTURE QUALITY, RECORDING RATE, PRESENCE/ABSENCE OF AUTOMATIC BACKUP, ALARM OPERATION TIME |
| | TABLE 2 | TIME XX: XX ~ XX: XX | NORMAL OPERATION: PICTURE QUALITY, RECORDING RATE, PRESENCE/ABSENCE OF AUTOMATIC BACKUP |
| | | | ALARM OPERATION: PICTURE QUALITY, RECORDING RATE, PRESENCE/ABSENCE OF AUTOMATIC BACKUP, ALARM OPERATION TIME |
| | ....... | | |
| | TABLE n | TIME XX: XX ~ XX: XX | NORMAL OPERATION: PICTURE QUALITY, RECORDING RATE, PRESENCE/ABSENCE OF AUTOMATIC BACKUP |
| | | | ALARM OPERATION: PICTURE QUALITY, RECORDING RATE, PRESENCE/ABSENCE OF AUTOMATIC BACKUP, ALARM OPERATION TIME |
| ........ | | | |
| SATURDAY | TABLE 1 | TIME XX: XX ~ XX: XX | NORMAL OPERATION: PICTURE QUALITY, RECORDING RATE, PRESENCE/ABSENCE OF AUTOMATIC BACKUP |
| | | | ALARM OPERATION: PICTURE QUALITY, RECORDING RATE, PRESENCE/ABSENCE OF AUTOMATIC BACKUP, ALARM OPERATION TIME |
| | TABLE 2 | TIME XX: XX ~ XX: XX | NORMAL OPERATION: PICTURE QUALITY, RECORDING RATE, PRESENCE/ABSENCE OF AUTOMATIC BACKUP |
| | | | ALARM OPERATION: PICTURE QUALITY, RECORDING RATE, PRESENCE/ABSENCE OF AUTOMATIC BACKUP, ALARM OPERATION TIME |
| | ....... | | |
| | TABLE n | TIME XX: XX ~ XX: XX | NORMAL OPERATION: PICTURE QUALITY, RECORDING RATE, PRESENCE/ABSENCE OF AUTOMATIC BACKUP |
| | | | ALARM OPERATION: PICTURE QUALITY, RECORDING RATE, PRESENCE/ABSENCE OF AUTOMATIC BACKUP, ALARM OPERATION TIME |

FIG. 5

| ALARM ASSOCIATING INFROMATION | ALARM 1 | CAMERA X, AREA X |
|---|---|---|
| | ALARM 2 | CAMERA X, AREA X |
| | ……… | |
| | ALARM Z | CAMERA X, AREA X |
| ALARM LINK RECORDING INFROMATION | TABLE 1 | 1: ALARM NO. |
| | | 2: ALARM NO., LINK RECOGNITION TIME |
| | | 3: ALARM NO., LINK RECOGNITION TIME |
| | | ……… |

FIG. 6

| AREA | INSTALLATION LOCATION | RELEVANT CAMERA |
|---|---|---|
| A | FIRST FLOOR (ENTRANCE) | CAMERAS 1, 2, 6, 9, 14, 15 |
| B | FIRST FLOOR (COUNTER) | CAMERAS 3, 4, 5, 7, 16 |
| C | SAFE | CAMERAS 10, 12 |
| D | ATM CORNER | CAMERAS 8, 11, 13 |

AREA A MULTI-SCREEN DISPLAY

AREA A → AREA B → AREA C → AREA D → SAME SEQUENCE IS PREPARED

AREA A RELEVANT CAMERA SEQUENCE

FIG. 11

| | | |
|---|---|---|
| OLDEST RECORDING DATA POSITION | | |
| LATEST RECORDING DATA POSITION | | |
| TOTAL DATA COUNT | | |
| RECORDING DATA INDIVIDUAL INFORMATION | RECORDING DATA NO. | |
| | PREVIOUS DATA RECORDING POSITION INFORMATION | |
| | NEXT DATA RECORDING POSITION INFORMATION | |
| | AREA IDENTIFIER | 1, 2, ···, M |
| | RELEVANT CAMERA INFORMATION | NUMBER OF RELEVANT CAMERAS, CAMERA NO. |
| | HIDDEN CAMERA INFORMATION | CAMERA NO. |
| | VIDEO RECORDING STATE DATA | |
| | VIDEO RECORDING END DATA | |
| | RECORDING DATA SIZE | |
| | RECORDING RATE, PICTURE QUALITY | |
| | RECORDING FACTOR | NORMAL RECORDING, ALARM RECORDING (ALARM NO.) |

* "RECORDING DATA INDIVIDUAL INFORMATION" EXISTS PER RECORDING DATA PIECE

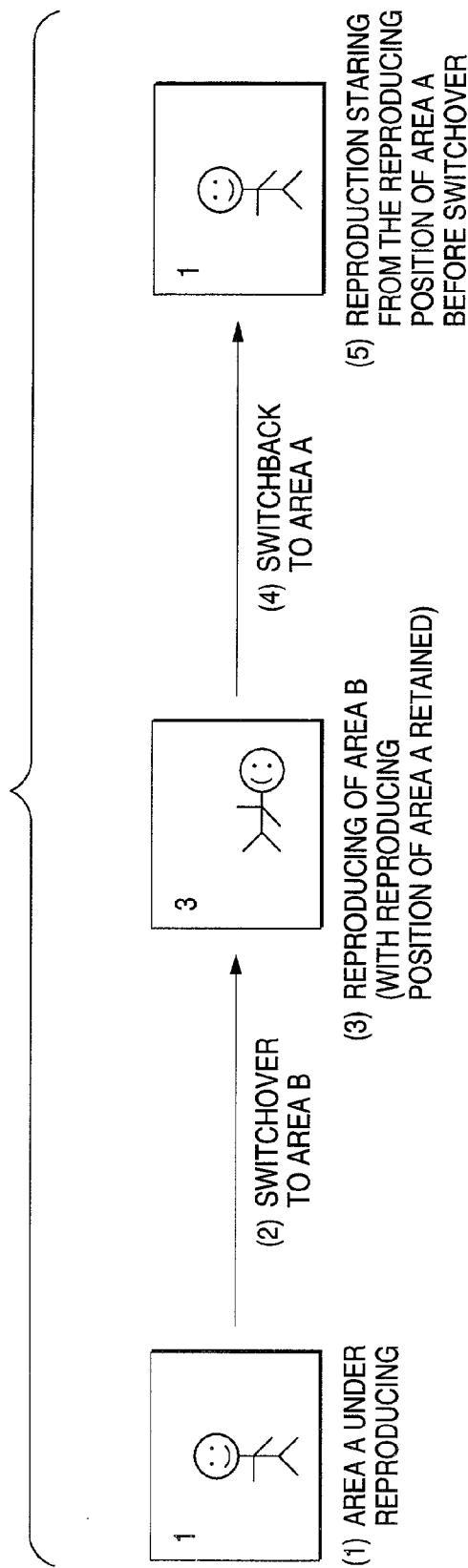

FIG. 13A

AREA A (UNDER REPRODUCING) | AREA B (UNDER REPRODUCING)

| 1 PM10:05 | 3 PM10:05 |
|---|---|
| 10 PM10:05 | 8 PM10:05 |

AREA C (UNDER REPRODUCING) | AREA D (UNDER REPRODUCING)

FIG. 13B

AREA A (UNDER REPRODUCING) | AREA B (UNDER REPRODUCING)

| 1 PM10:05 | 3 PM08:32 |
|---|---|
| 10 PM09:50 | 8 PM00:03 |

AREA C (UNDER REPRODUCING) | AREA D (UNDER REPRODUCING)

FIG. 13C

AREA A (SUSPENDED) | AREA B (UNDER REPRODUCING)

| 1 PM10:05 | 3 PM08:32 |
|---|---|
| 10 PM09:50 | 8 PM00:03 |

AREA C (SUSPENDED) | AREA D (SUSPENDED)

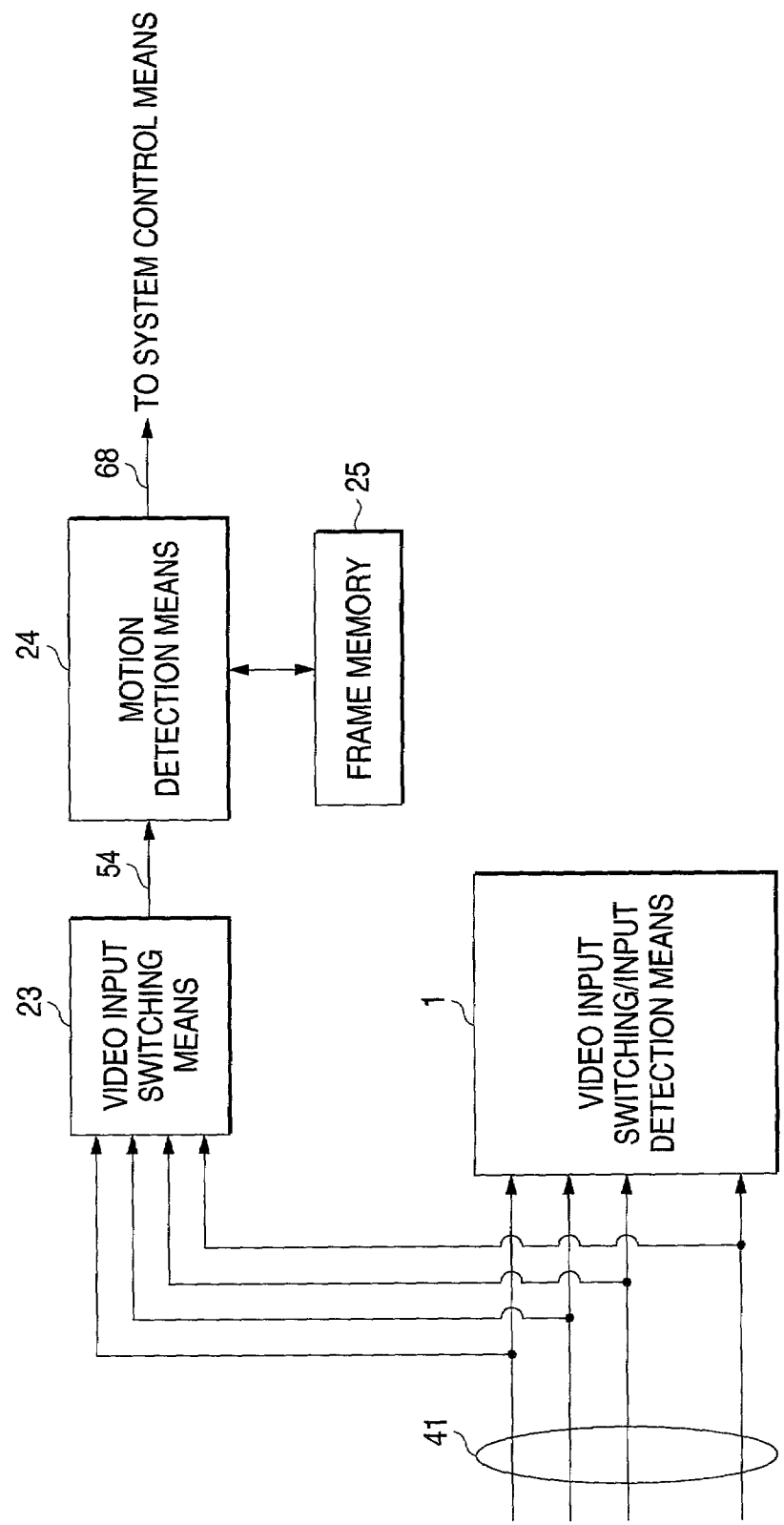

DIGITAL RECORDING/REPRODUCING APPARATUS FOR SURVEILLANCE

BACKGROUND OF THE INVENTION

The present invention relates to digital recording/reproducing apparatus for surveillance which digitizes and records pictures shot by a plurality of monitoring cameras installed in a plurality of monitoring areas, and displays reproduced pictures of recorded pictures or pictures output from the monitoring cameras at that time (hereinafter referred to as live pictures).

Conventional digital recording/reproducing apparatus for surveillance digitizes and records on a hard disk the pictures shot by a plurality of monitoring cameras as well as displays the shot live pictures. The apparatus searches and reproduces shot pictures or displays live pictures by using the shooting time as a search key. The apparatus changes the recording conditions for videos when an alarm occurs.

The conventional digital recording/reproducing apparatus does not split the monitoring area into a plurality of areas for management nor record or reproduce shot pictures or display live pictures in a different way for each split area.

SUMMARY OF THE INVENTION

The invention aims at providing a digital recording/reproducing apparatus for surveillance that allows arbitrary setting of display patterns of live pictures or reproduced pictures per monitoring area in accordance with the purpose of use. The invention also aims at providing a digital recording/reproducing apparatus that can control recording via monitoring cameras in accordance with the situation.

According to the present invention, a digital recording/reproducing apparatus for surveillance which records pictures shot by a plurality of monitoring cameras installed in monitoring areas and reproduces recorded pictures or live pictures shot by the monitoring cameras, characterized in that the digital video recording/reproducing apparatus comprises relevant monitoring camera information, recording condition information and display condition information and records the shot pictures and displays said live pictures based on the relevant camera information, the recording condition information and the display condition information.

BRIEF DESCRIPTION OF THE DRAWINGS

FIG. 2 shows the data structure of area management information;

FIG. 4 shows an example of timer recording information;

FIG. 5 shows an example of alarm management information;

FIG. 6 shows a relationship between monitoring areas and monitoring cameras;

FIG. 11 shows an example of recorded picture data list information;

FIG. 12 is a display example for switching a reproduced video between monitoring areas;

FIG. 13 shows an example of split display of reproduced pictures;

FIG. 14 shows a general configuration of motion detection means;

DETAILED DESCRIPTION OF THE PREFERRED EMBODIMENTS

An embodiment of the invention will be explained referring to FIGS. 1 through 18.

Figure 1:
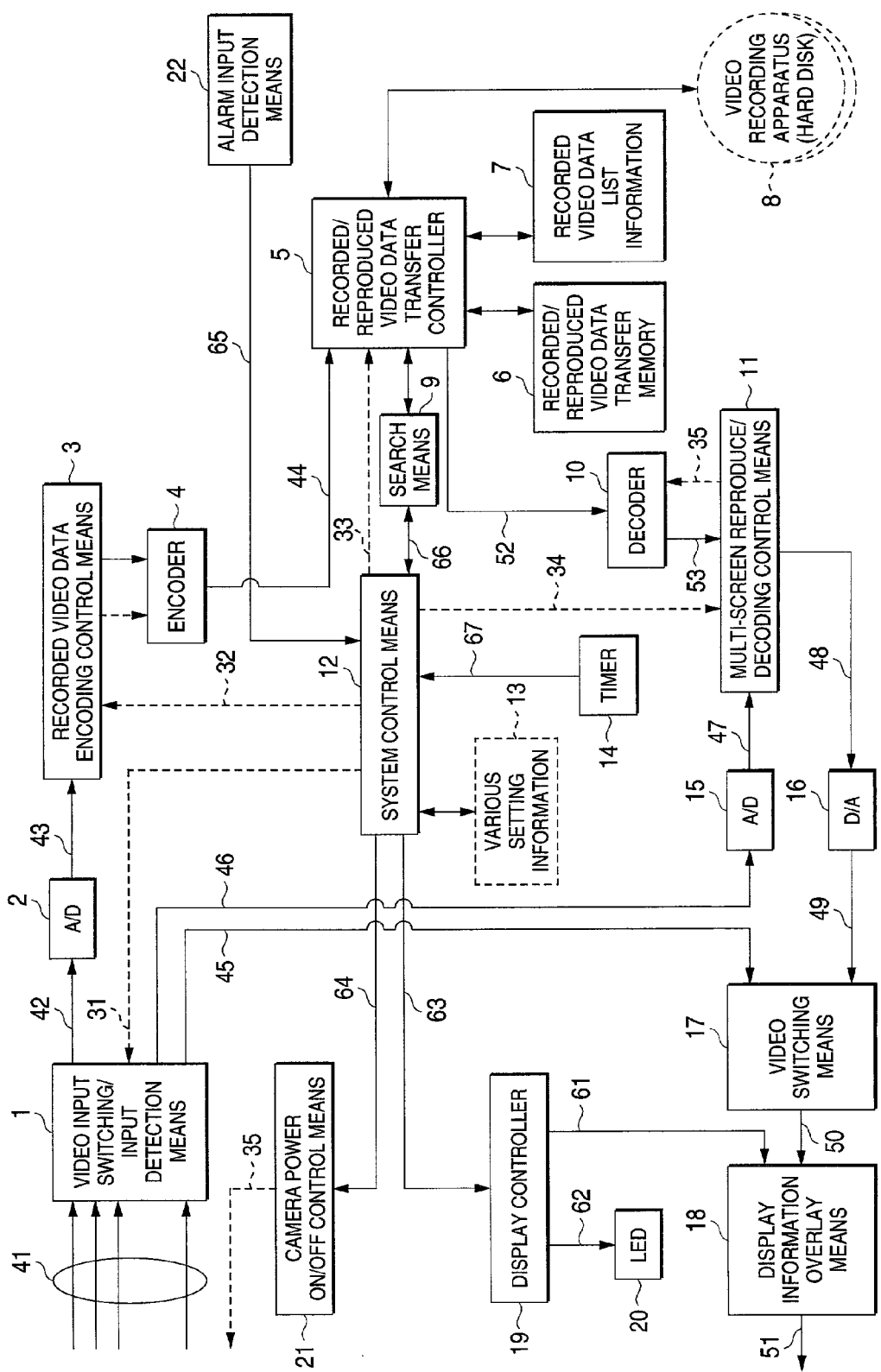
FIG. 1 shows a general configuration of a digital video recording/reproducing apparatus for surveillance according to the invention.

FIG. 1 shows a general configuration of monitoring digital recording/reproducing apparatus for surveillance according to the invention. Video signals 41 of the picture shot by monitoring cameras (not shown) installed in a plurality of locations are input to video input switching/input detection means 1 and a picture to be recorded 42 is selected and sent to recorded video data encoding control means 3 via an A/D converter 2. Switching between a plurality of video signals 41 is made via a switching control signal 31 from system control means 12.

The recorded video data encoding control means 3 captures digital video data 43 from the A/D converter 2 into a frame memory (not shown) based on a control signal 32 from the system control means 12 to perform encoding control of pictures. The encoder 4 performs encoding of digital video data based on the recorded video data encoding control means 3 and sends encoded data 44 to a recorded/reproduced video data transfer controller 5.

The recorded/reproduced data transfer controller 5 temporarily stores encoded data 44 into recorded/reproduced video data transfer memory 6 and records the data on video recording apparatus 8 such as a hard disk under predetermined conditions and with a predetermined timing. Operation of the recorded/reproduced video data transfer controller 5 is a controller based on a control signal 33 from the system control means 12.

A video signal 45 from the video input switching/input detection means 1 is sent to video switching means 17 and used for displaying live pictures. To display a multi-screen pictures as a live picture, the video signal is converted to video data 47 via an A/D converter 15, undergoes multi-screen processing via multi-screen reproduced/decoding control means 11 and sent to the video switching means 17 via a D/A converter 16. The multi-screen reproduce/decoding control means 11 uses frame memory (not shown) to perform multi-screen processing based on a control signal from the system control means 12.

On a video signal from the video switching means 17 are overlaid various state signals 61 such as state of monitoring cameras by display information overlay means and output to a Monitor (not shown).

To reproduce/display a picture recorded by the video recording apparatus 8, search means 9 operates based on information 66 from the system control means and reads predetermined encoded video data 52 and sends the data to a decoder 10. The decoder 10 decodes the encoded video data 52 based on a control signal 35 from the multi-screen reproduce/decoding control means 11 and the multi-screen reproduce/decoding control means 11 performs multi-screen processing of the data as required. The video data 48 thus generated is sent to the monitor (not shown) via the D/A converter 16, the video switching means 17 and the display information overlay means 18.

The system control means 12 controls the entire digital recording/reproducing apparatus for surveillance. The system control means 12 controls picture recording operation, picture reproduce operation and live picture display operation based on various setting information 13 and an alarm signal 65 from alarm input detection means 22. The various setting information 13 consists of area management information, live picture display sequence information, timer recording information, and alarm management information per monitoring area.

FIG. 2 shows the data structure of area management information. The area management information is set per management area. Preset information includes an area identifier to identify the area, the quantity and the numbers of the monitoring cameras installed in the monitoring area, the numbers of the hidden cameras, and screen display position information. Areas to store video recording state of the cameras, recorded video data information, reproduce operation information, reproduce data information, and cumulative alarm operation information are provided and updated as required.

Figure 3:
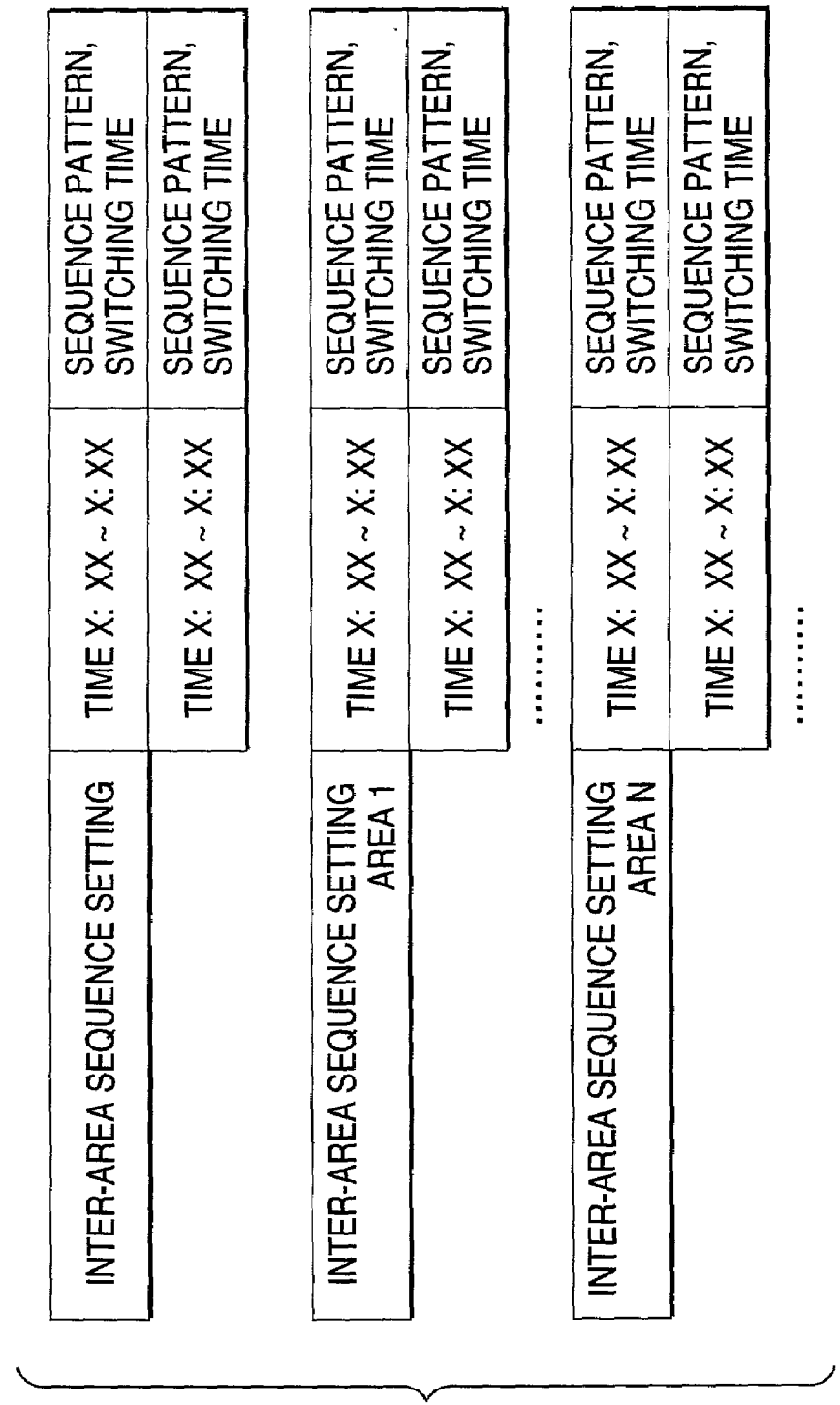
FIG. 3 shows an example of live pictures display sequence setting information.

FIG. 3 shows an example of live picture display sequence setting information. Inter-area sequence setting information is for setting the timing for switching between areas to be displayed. Intra-area sequence setting information is for setting the timing for switching between the pictures shot by the monitoring cameras in the area. The intra-area sequence setting information is set per monitoring area. A plurality of pieces of such information can be set according to the system operation times.

FIG. 4 shows an example of timer recording information. The timer recording information is for setting recording conditions on the basis of monitoring area, type of operation days (weekdays, holidays, day of the week), or operation times. Recording conditions assumed when an alarm has occurred are set separately.

FIG. 5 shows an example of alarm management information. Alarm associating information shows the correspondence between respective alarm signals and monitoring cameras and monitoring areas. Alarm link recording signal is used for determine whether the intervals of a plurality of alarms are based on the same event. This information records alarm numbers and intervals of alarms in correspondence.

Camera power ON/OFF control means 21 outputs a monitoring camera power ON/OFF signal 35 based on a signal 64 from the system control means 12. The system control means 12 turns off the power of the non-operating monitoring cameras based on the timer video recording information and the relevant camera information in the area management information.

The system control means 12 instructs LED 20 to indicate the states of monitoring states via a display controller 19 based on the video recording state information and the reproducing operation information in the area management information.

Display of live pictures will be explained. Assume that the target for monitoring is a bank and that the monitoring area is split into areas A, B, C and D and 16 monitoring cameras are installed in the correspondence shown in FIG. 6.

Figures 7, 8:
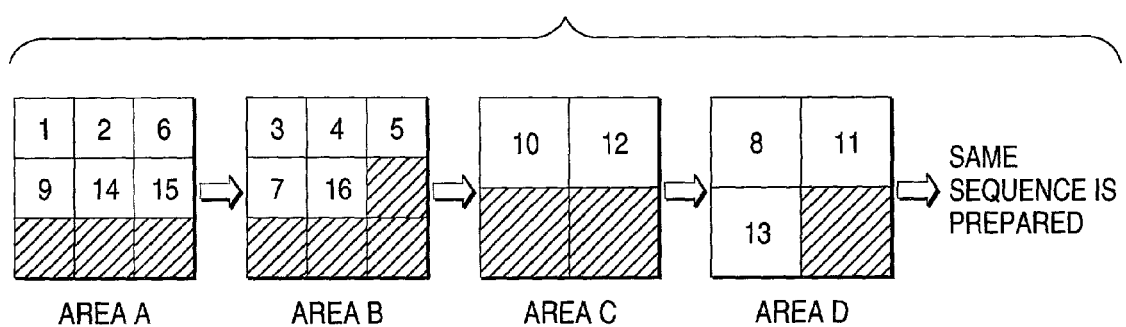
FIG. 7 shows an example of pictures of multi-screen display.
FIG. 8 is a display example where the multi-screen display is switched over per monitoring area.

To simultaneously check live pictures from monitoring cameras per area, instructing that operation from input means (not shown) causes the system control means 12 to send the number of relevant cameras and camera numbers in the area management information to the multi-screen reproduce/decoding control means 11, which creates multi-screen video data from the video data 47 output from the A/D converter 15. The resulting data is sent via the D/A converter 16, the video switching means 17, and the display information overlay means 18 and the video as shown in FIG. 7 is displayed.

The system control means 12, instructed to switch the multi-screen display picture on a per monitoring area, switches between monitoring areas based on the inter-area sequence setting information in the live picture display sequence information and sends the number of the relevant cameras and the camera numbers to the multi-screen reproduce/decoding control means 11. In this case, display example is as shown in FIG. 8. The inter-area sequence switch timing is changed according to the system operation time.

Figure 9:
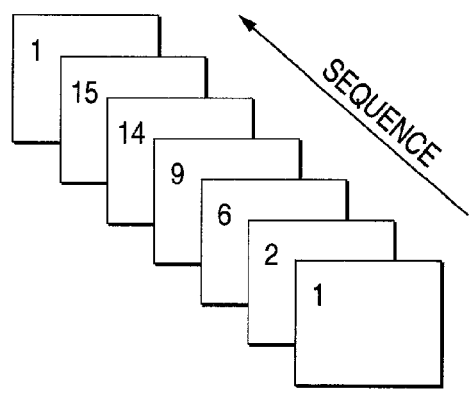
FIG. 9 is a display example where pictures from a plurality of monitoring cameras in a specific monitoring area is switched over.

The system control means 12, instructed to switch the pictures from the monitoring cameras in a specified monitoring area to the full-monitor pictures, the system control means 12 switches the video signal 45 of the video input switching/input detection means 1 based on the intra-area sequence setting information in the specified monitoring area. Pictures displayed via the video switching means 17 and the display information overlay means 18 are as shown in FIG. 9.

Figure 10:
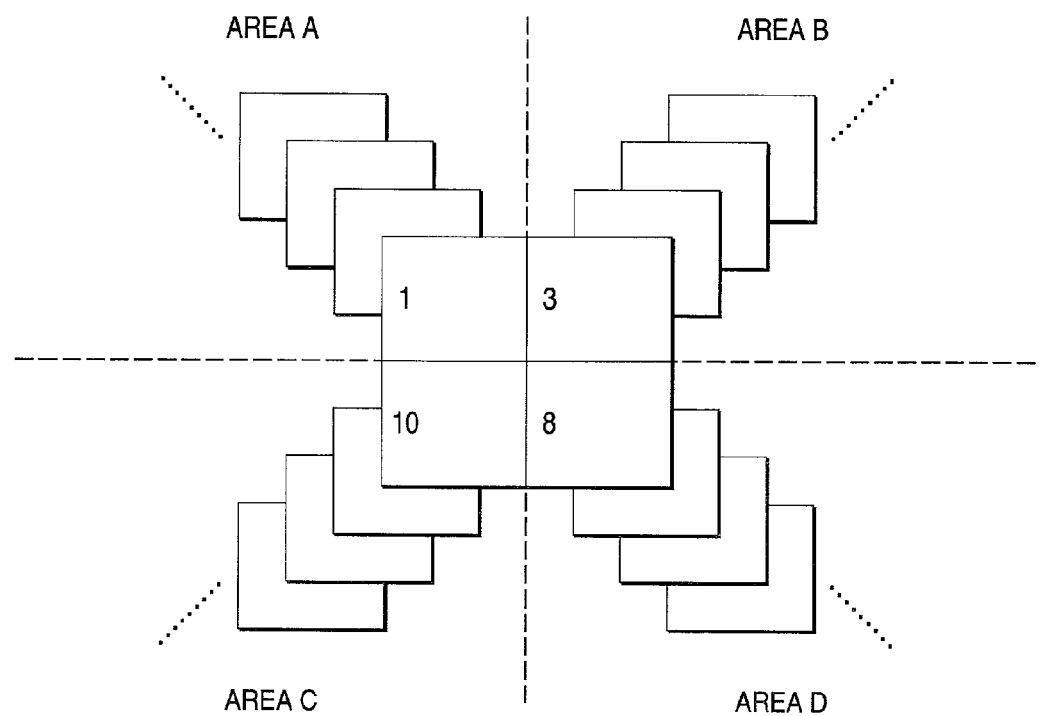
FIG. 10 is a display example where pictures of a plurality of monitoring areas are simultaneously displayed.

In case the display screen is split according to the number of monitoring areas to display the live pictures of a plurality of monitoring areas, the system control means sends a control signal 34 that is based on the screen display position information in the area management information, the relevant monitoring camera information and the intra-area sequence setting information in the live picture sequence setting information to the multi-screen reproduce/decoding control means 11 in order to display pictures shown in FIG. 10. In FIG. 10, each split area has the same sequence as that in FIG. 9, and the live pictures from the relevant monitoring cameras are displayed in switched manner.

Recording of pictures is made by sending control signals 32, 33 pursuant to the setting information in the timer recording information to the recorded video data encoding control means 3 and the recorded/reproduced video data transfer controller 5. These control signals 32, 33 are changed when an alarm occurs. Relationship between the type of the alarm signal 65 from the alarm input detection means 22 and the monitoring areas and the monitoring cameras is obtained by referencing the alarm management information. Attributes of individual recorded video data corresponding to recorded videos are retained as recorded video data list information 7. FIG. 11 shows an example of recorded video data list information.

Reproduction of recorded pictures is made by using the monitoring area and time as keys. Reproduced video data information in that case is retained in the area management information so that reproduce of recorded pictures can be made independently on a per search monitoring area basis.

Thus, as shown in FIG. 12, in case, during reproduction of the recorded information of the monitoring camera 1 in Area A (1), Area A is switched over to Area B (2) to reproduce the recorded video of the monitoring camera 3 (3), the reproducing position of Area A is retained. IN case Area B is switched back to Area A (4), it is possible to reproduce starting from the reproduction position of Area A before switchover (5). Such a reproducing operation is effective because it is possible to check the situation where a bank robber moves with the progress of time, at the entrance (Area A, 2:00 p.m.), the counter (Area B, 2:15 p.m.), and the safe (Area C, 2:26 p.m.), by switching the displays alone.

In case pictures per monitoring area are displayed while split on a multi-screen, it is possible to independently control reproduced videos per area. FIG. 13 shows an example of split display of reproduced videos. (1) shows an example of simultaneous display based on the time axis where reproduced pictures of monitoring areas A through D at the identical time are displayed simultaneously. (2) is an example where different time axes are assigned to monitoring areas and reproduced pictures on independent time axes are simultaneously displayed. (3) is an example where picture of a specific monitoring area (B) is reproduced on a specific time axis with monitoring areas A, C and D in suspended state.

Figure 15:
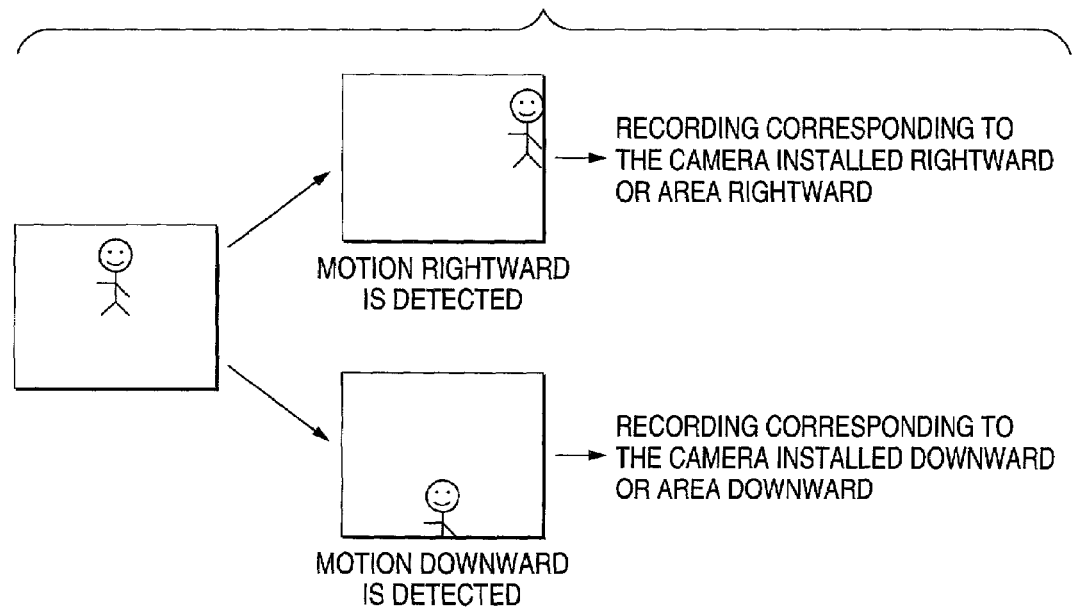
FIG. 15 shows the relationship between the monitoring target and motion detection.

The digital recording/reproducing apparatus for surveillance according to the invention is further equipped with motion detection means shown in FIG. 14 for recording pictures of a monitoring area or from monitoring cameras therein in the direction that corresponds to the motion of the monitoring target. Monitoring cameras (not shown) in a plurality of locations are input to video input switching/input detection means 1 and video input switching means 23 then motion detection means 24. The motion detection means detects the direction of the motion or the monitoring target based on the comparison of the video stored in the frame memory 26 and the input video 54, then sends a detection signal 68 to the system control means 12. The system control means 12, based on the detection signal 68 and the motion detection management information, instructs the recorded video data encoding control means 3 and the recorded/reproduced video data transfer controller 5 to select a recorded video. The motion detection management information presets the relationship between detection of motion and monitoring areas. FIG. 15 shows the relationship between the monitoring target and motion detection.

Figure 16:
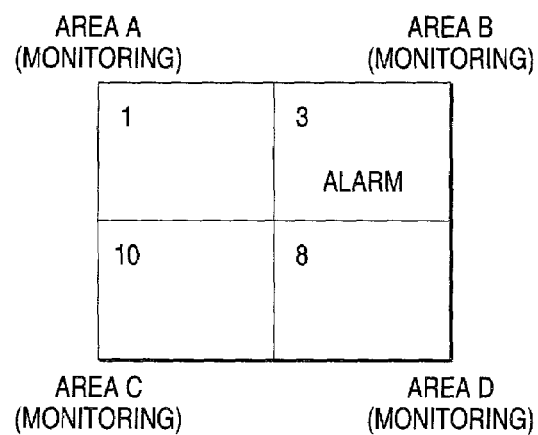
FIG. 16 is a display example of a live picture at occurrence of an alarm.

When an alarm occurs, the recording conditions are changed as mentioned earlier. Display of live pictures is changed as well. That is, an alarm is displayed on the screen of the related monitoring area based on the alarm associating information in the alarm management information as shown in FIG. 16.

Figure 17:
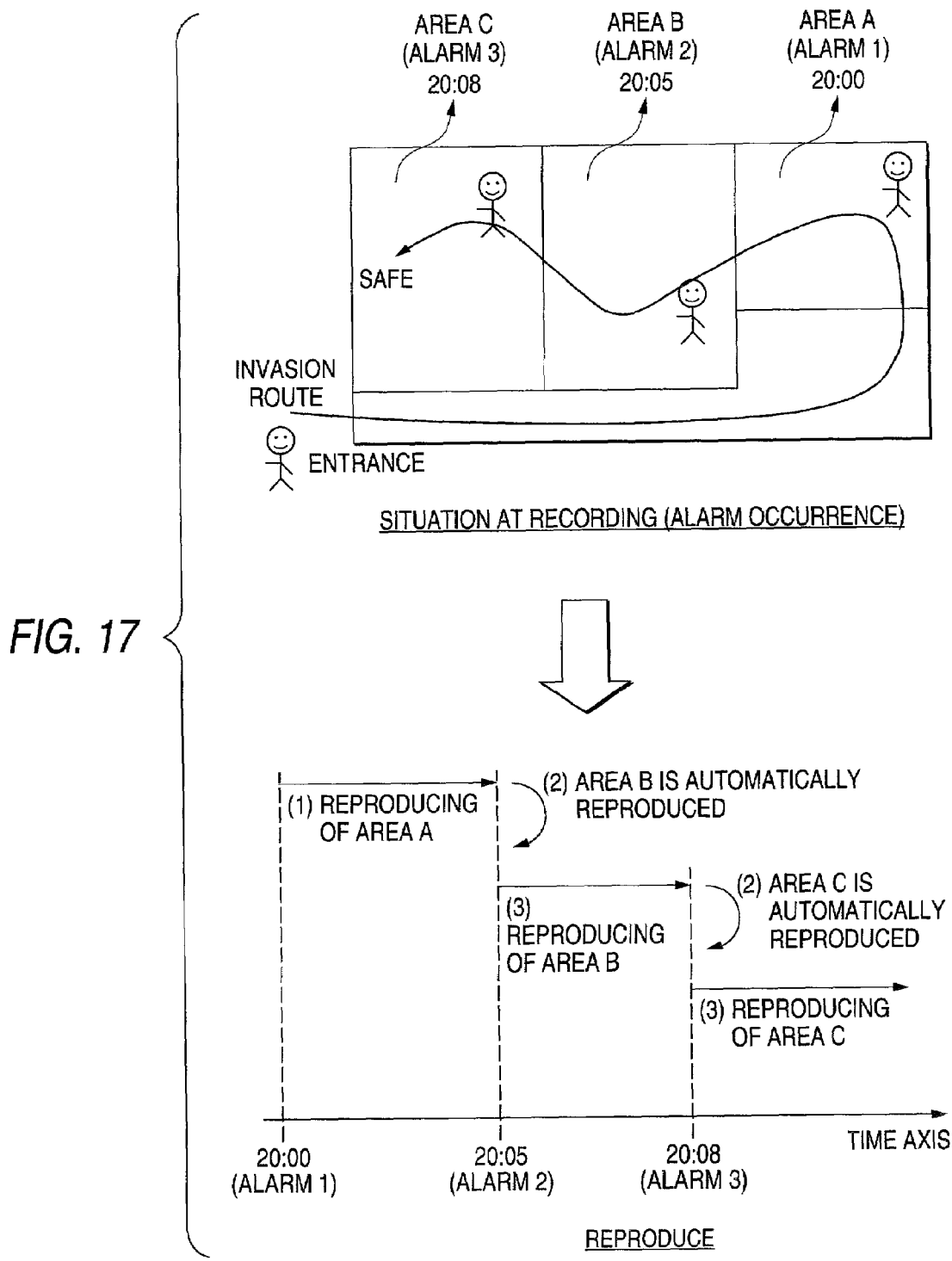
FIG. 17 explains recording and reproducing linked with alarm.

When an alarm occurs, the alarm input time is also recorded. Thus, it is possible to selectively reproduce the most appropriate picture when the recorded video on occurrence of alarm is reproduced. For this purpose, information to identify the occurrence of a plurality of alarm signals based on the same event is stored in the alarm link recording information in the alarm management information. As shown in FIG. 17, assuming that a thief invades from the entrance and to the safe at the nighttime in the order of Area A, Area B, and Area C, information on intervals of occurrence of a plurality of alarms is stored in the alarm link recording information in advance. In case an alarm has occurred that coincides with the alarm link information, the corresponding video is given an identifier to indicate the same event and recorded. For reproducing, linked videos are automatically switched based on this identifier.

The alarm count is recorded as cumulative alarm operation information in the area management information.

Figure 18:
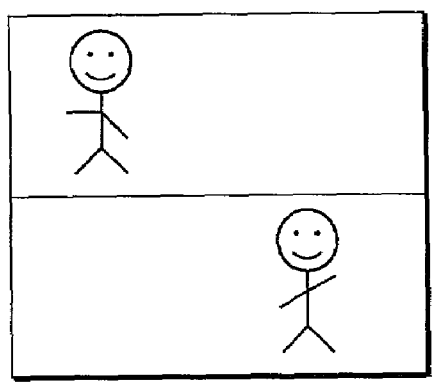
FIG. 18 is an example where a live picture and a reproduced picture from the same camera are simultaneously displayed.

In case a picture recorded in video recording apparatus is reproduced when a live picture by a monitoring camera is displayed, a live picture and a reproduced picture from the same camera can be simultaneously displayed as shown in FIG. 18.

In monitoring areas are installed hidden monitoring cameras as required. Pictures shot by the hidden cameras are not displayed as live pictures and the relevant operation state is not displayed. Setting is made so that a special identifier may be appended for video recording and only certain administrators may reproduce the pictures.

In case a fault in a monitoring camera or a cable should take place, it is possible to change the recording and live picture display conditions by changing the angles of the other monitoring cameras in the same monitoring area.

A specific picture recorded in video recording apparatus can be automatically or manually recorded on backup video recording apparatus such as DVD-RAM as required.

It is possible to detect a change at a minute level by storing a picture from a specific monitoring camera and comparing the stored picture with the picture under shooting. This feature can be utilized in monitoring of the ground condition of a road or a land where a landslide could occur.

As understood from the foregoing description, the invention provides digital video recording/reproducing apparatus for surveillance that allows arbitrary setting of display patterns of live pictures or reproduced pictures per monitoring area in accordance with the purpose of use.

What is claimed is:

1. Digital recording/reproducing apparatus for surveillance, which records pictures shot by a plurality of monitoring cameras installed in monitoring areas, and reproduces recorded pictures or live pictures shot by said monitoring cameras, further comprising:

relevant monitoring camera information, recording condition information and display condition information for each monitoring area, and said shot pictures are recorded and said live pictures are displayed based on said relevant camera information, said recording condition information and said display condition information, wherein when a monitoring area to be displayed is specified, a display screen is split according to the relevant monitoring camera information in the specified monitoring area and displays a corresponding live picture.

2. Digital recording/reproducing apparatus for surveillance, which records pictures shot by a plurality of monitoring cameras installed in monitoring areas, and reproduces recorded pictures or live pictures shot by said monitoring cameras, further comprising:

relevant monitoring camera information, recording condition information and display condition information for each monitoring area, and said shot pictures are recorded and said live pictures are displayed based on said relevant camera information, said recording condition information and said display condition information, wherein a display screen is split according to the relevant monitoring camera information in each monitoring area and displays a corresponding live picture as well as switches between split screens per monitoring area according to said display condition information.

3. The digital video recording/reproducing apparatus according to claim 2, wherein a switching display timing per monitoring area is switched by an operation time.

4. The digital video recording/reproducing apparatus according to claim 1, wherein a displayed picture is switched to said live picture.

5. Digital recording/reproducing apparatus for surveillance, which records pictures shot by a plurality of monitoring cameras installed in monitoring areas, and reproduces recorded pictures or live pictures shot by said monitoring cameras, further comprising:

relevant monitoring camera information, recording condition information and display condition information for each monitoring area, and said shot pictures are recorded and said live pictures are displayed based on said relevant camera information, said recording condition information and said display condition information, wherein a display screen is split according to a number of said monitoring areas, and a live picture corresponding to the relevant monitoring camera information is displayed for A specified monitoring area on each split screen according to said display condition information.

6. The digital video recording/reproducing apparatus according to any of claims 1 through 5, wherein a picture is input without live picture display, and recorded with a special identifier appended.

* * * * *